(12) United States Patent
Edwards

(10) Patent No.: US 6,824,105 B2
(45) Date of Patent: Nov. 30, 2004

(54) DROGUE FOR IN-FLIGHT REFUELING

(75) Inventor: John Edwards, Woodford (GB)

(73) Assignee: BAE Systems plc, London (GB)

( * ) Notice: Subject to any disclaimer, the term of this patent is extended or adjusted under 35 U.S.C. 154(b) by 58 days.

(21) Appl. No.: 10/451,907

(22) PCT Filed: Jan. 10, 2002

(86) PCT No.: PCT/GB02/00099

§ 371 (c)(1),
(2), (4) Date: Jun. 27, 2003

(87) PCT Pub. No.: WO02/055385

PCT Pub. Date: Jul. 18, 2002

(65) Prior Publication Data

US 2004/0050998 A1 Mar. 18, 2004

(30) Foreign Application Priority Data

Jan. 13, 2001 (GB) .............................. 0100968

(51) Int. Cl.⁷ ............................................ B64D 37/00
(52) U.S. Cl. ................................................. 244/135 A
(58) Field of Search ......................... 244/135 A, 135 R, 244/135 B

(56) References Cited

U.S. PATENT DOCUMENTS 2,946,543 A * 7/1960 Gordon et al. .......... 244/135 A
2,960,291 A    11/1960 Patterson
2,998,949 A *  9/1961 Patterson ................... 244/145
3,011,737 A   12/1961 Morrow
3,011,742 A * 12/1961 Gross ..................... 244/135 A
5,255,877 A * 10/1993 Lindgren et al. ....... 244/135 A
5,427,333 A *  6/1995 Kirkland ................. 244/135 A
6,145,788 A * 11/2000 Mouskis et al. ........ 244/135 A
6,375,123 B1 *  4/2002 Greenhalgh et al. .... 244/135 A
6,588,465 B1 *  7/2003 Kirkland et al. ............ 141/279

FOREIGN PATENT DOCUMENTS

GB          2237251       5/1991

* cited by examiner

Primary Examiner—Charles T. Jordan
Assistant Examiner—Stephen A. Holzen
(74) Attorney, Agent, or Firm—Nixon & Vanderhye P.C.

(57) ABSTRACT

The drogue 11 comprises a canopy 50 supported by a plurality of adjustable ribs 42 and further ribs 43. A control unit 36 is provided for moving the adjustable ribs 42 into a first position P1, in which an air stream can inflate the canopy 50 whereby drag on the canopy causes the drogue 11 to draw a fuel hose 74 from a tanker aircraft 63 into an extended position, and into a second position P2 in which the canopy 50 takes on a cylindrical form and drag thereon in the extended position will be reduced. Selected adjustable supports are movable relative to the others by a control mechanism 41 to adjust a selected portion of the canopy 50 whereby the drag on that portion will be increased and the drogue 11 will move to a new position.

19 Claims, 3 Drawing Sheets

DROGUE FOR IN-FLIGHT REFUELING

This application is the US national phase of International Application No. PCT/GB02/00099, filed 10 Jan. 2002, the entire content of which is hereby incorporated by reference.

The invention relates to a drogue for in-flight refuelling.

A known in-flight refuelling drogue comprises a tapered annular parachute-like canopy supported by a plurality of rigid metal ribs. When the drogue is trailing behind an aircraft for in-flight refuelling, it will typically generate around 1,000 pounds of aerodynamic drag which increases with the square of the speed. The drag on the drogue is utilised to pull a refuelling hose from a pod on the tanker aircraft. The drag also resists docking forces from a receiver aircraft to be refuelled and it also serves to maintain stability. However, if a receiver in the form of an unmanned aerial vehicle (UAV) were subjected to the typical drag load from the drogue, the load could easily overwhelm such a small aircraft.

FIG. 1 of the accompanying drawings is a diagrammatic cross section through part of a drogue 1 and shows the way in which a plurality of rigid metal ribs 2 are pivoted at their inner ends as viewed in FIG. 1 to a fulcrum ring 3. In practice, there will be a multiplicity of such ribs equally spaced around the ring for example, forty two ribs in all. The outer ends of the ribs 2 support an annular canopy 4. In use, the drogue 1 will be stowed in a refuelling pod on the tanker aircraft and in the stowed condition, the ribs will occupy folded positions indicated in broken lines in FIG. 1. When the drogue is to be released for refuelling an aircraft, the drogue is allowed to move out of the pod and the air stream fills the canopy 4, causing the ribs 2 to be moved into the full line position in FIG. 1. The drag created pulls the drogue backwards thereby drawing the refuelling hose from the pod. The drag stabilises the drogue 1 by creating equal outward forces all around the canopy 4.

Stability of the drogue is achieved by utilising the "dihedral" effect of the canopy 4. The canopy 4 is angled to the airflow F such that if the angle A of the canopy 4 changes relative to the airflow F, the forces on part of the canopy 4 will increase as the cross sectional area of that part presented to the airflow F increases. On the other hand, the diametrically opposite part of the canopy 4 will present a smaller angle to the airflow F and the drag on that area deceases. The effect causes the drogue 1 to be self centring so that equal forces act all around the canopy 4. The stability created by the canopy 4 is adequate for normal aircraft being refuelled to achieve safe docking.

To achieve a docking connection when refuelling, a high degree of crew training is involved due to the way in which the drogue tends to position itself in response to airflow. It is well known that when a receiver aircraft approaches a drogue, the presence of the aircraft modifies the direction of airflow over the drogue and the drogue has no option but to follow the new airflow rather than maintain its original position relative to the tanker aircraft. As the receiver aircraft approaches the new position of the drogue the airflow over the drogue is modified again and so on. Generally, the larger the receiver aircraft the greater the airflow disturbance over the drogue. In response, the pilot of the receiver aircraft has to learn established techniques that will involve approaching the drogue quickly and aiming at a point in space to which the drogue will move in response to the approaching aircraft. To pilot the receiver aircraft correctly in such conditions involves a great deal of skill.

An object of the present invention is to provide a drogue which will be easier to position relative to a receiver aircraft.

According to a first aspect of the invention there is provided a drogue for in-flight refuelling comprising a canopy supported by a plurality of adjustable supports such as ribs, control means for moving the supports into a first position, in which the air stream can inflate the canopy whereby drag on the canopy, in use, will cause the drogue to draw a fuel hose from a tanker aircraft into an extended position, and into a second position in which drag on the canopy in the extended position will be reduced, at least one of the adjustable supports being movable relative to the others by control means to adjust a selected portion of the canopy whereby the drag on that portion will be increased and the drogue will move to a new position.

By reducing the drag, the force on an aircraft pushing forward into the drogue for refuelling will likewise be reduced, a factor which is of particular importance when it comes to in-flight refuelling of a UAV. According to a second aspect of the invention there is provided a method of controlling a drogue comprising a canopy supported by a plurality of adjustable supports such as ribs, the method comprising positioning the supports to allow an air stream to inflate the canopy such that drag on the canopy causes the drogue to draw a fuel hose from a tanker aircraft into an extended position, adjusting the adjustable supports so as to position the canopy to reduce drag on the canopy in the extended position and controlling one or more of the adjustable supports to cause drag to vary on a selected portion of the canopy and thereby cause the drogue to move to a new position.

In either the first or second aspect of the invention:

The adjustable supports preferably move the canopy into a position so that the canopy takes on a substantially cylindrical form after the hose reaches its extended position to minimise drag.

Preferably, further supports are provided for the canopy. The canopy may be arranged such that one edge is mounted on the adjustable supports and another edge is mounted on the further supports. Preferably, the further supports are pivotally connected to the adjustable supports. Some of the supports may be formed with slots in which the others of said supports are slidable. In the latter case, the further supports may be the ones formed with the slots.

The adjustable supports may be connected to mounting means which can be moved angularly to control the positions of given adjustable supports relative to others. Preferably, the mounting means can be moved axially of the drogue so as to move all adjustable supports simultaneously.

The mounting means may be movable by a control mechanism which preferably includes an angularly movable driving element. The driving element is preferably mounted for angular movement on a bearing and may take the form of a collar. Preferably, the bearing is mounted for axial movement on part of the drogue. The angularly moveable driving element may be arranged such that when the element is tipped in one direction to move selected adjustable mounting means in said one direction, another portion of the element tips in an opposite direction to move further selected adjustable mounting means in said opposite direction.

In a preferred embodiment, a controllable flying surface arrangement is proved for controlling stability of the drogue. The flying surface arrangement preferably operates in response to a signal received from at least one sensor such as an accelerometer within the drogue. Electric power for operating the flying surface arrangement can be generated using an air-driven turbine on the drogue. As the drag on the drogue will be reduced, relatively small flying surfaces can be used which, in turn, will require small actuators to drive them and will enable fast flying-surface response to be achieved.

According to a third aspect of the invention there is provided a tanker aircraft having a drogue in accordance with the first aspect of the invention or of the subsidiary clauses relating thereto.

A drogue and a method of controlling the drogue will now be described by way of example with reference to the remaining accompanying drawings in which.

Figure 2:
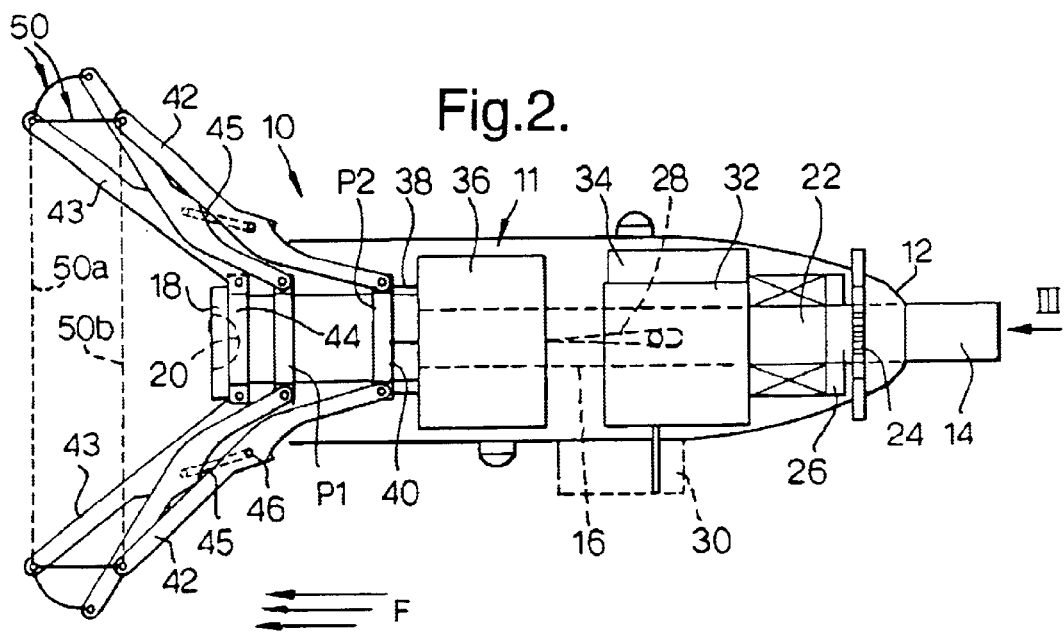
FIG. 2 is a diagrammatic longitudinal cross section through a drogue in accordance with the invention.
Figure 3:
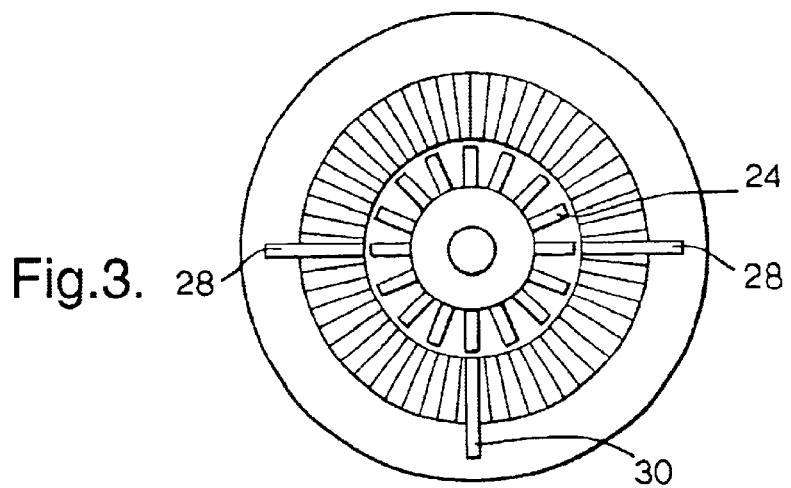
FIG. 3 is an end view of the drogue shown in FIG. 2 looking in the direction of arrow III in FIG. 2.
Figure 5:
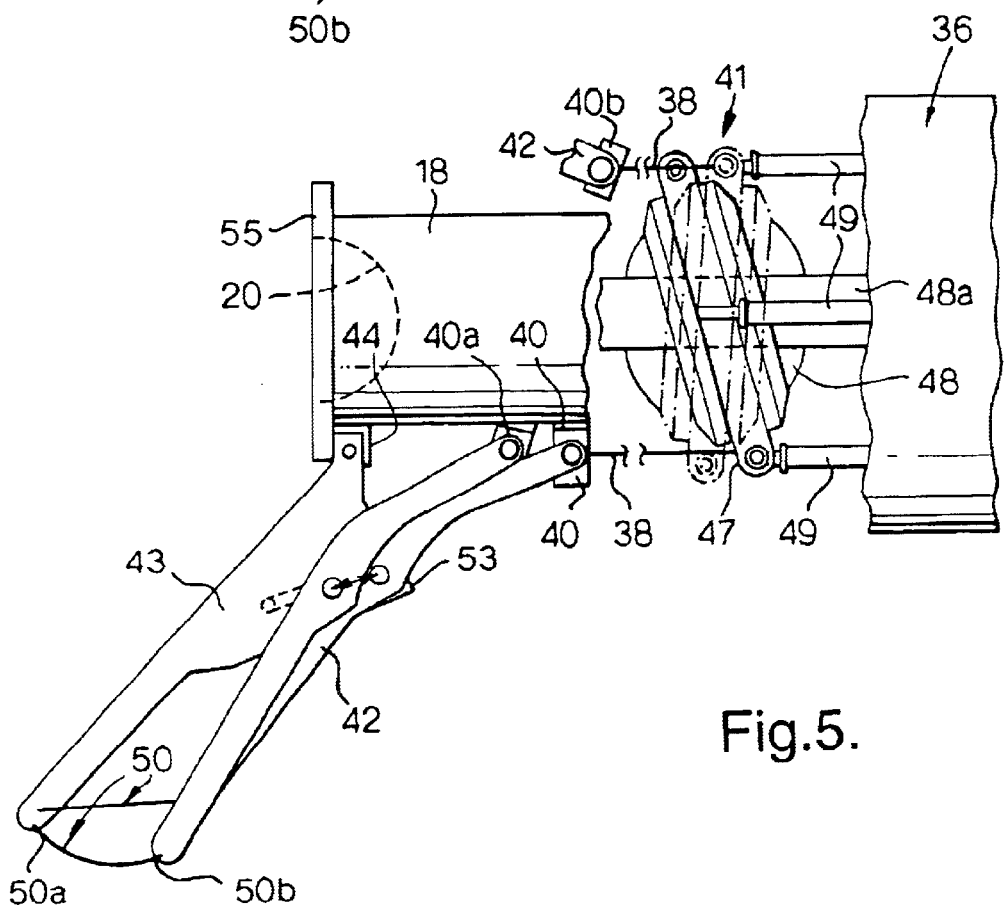
Figure 6:
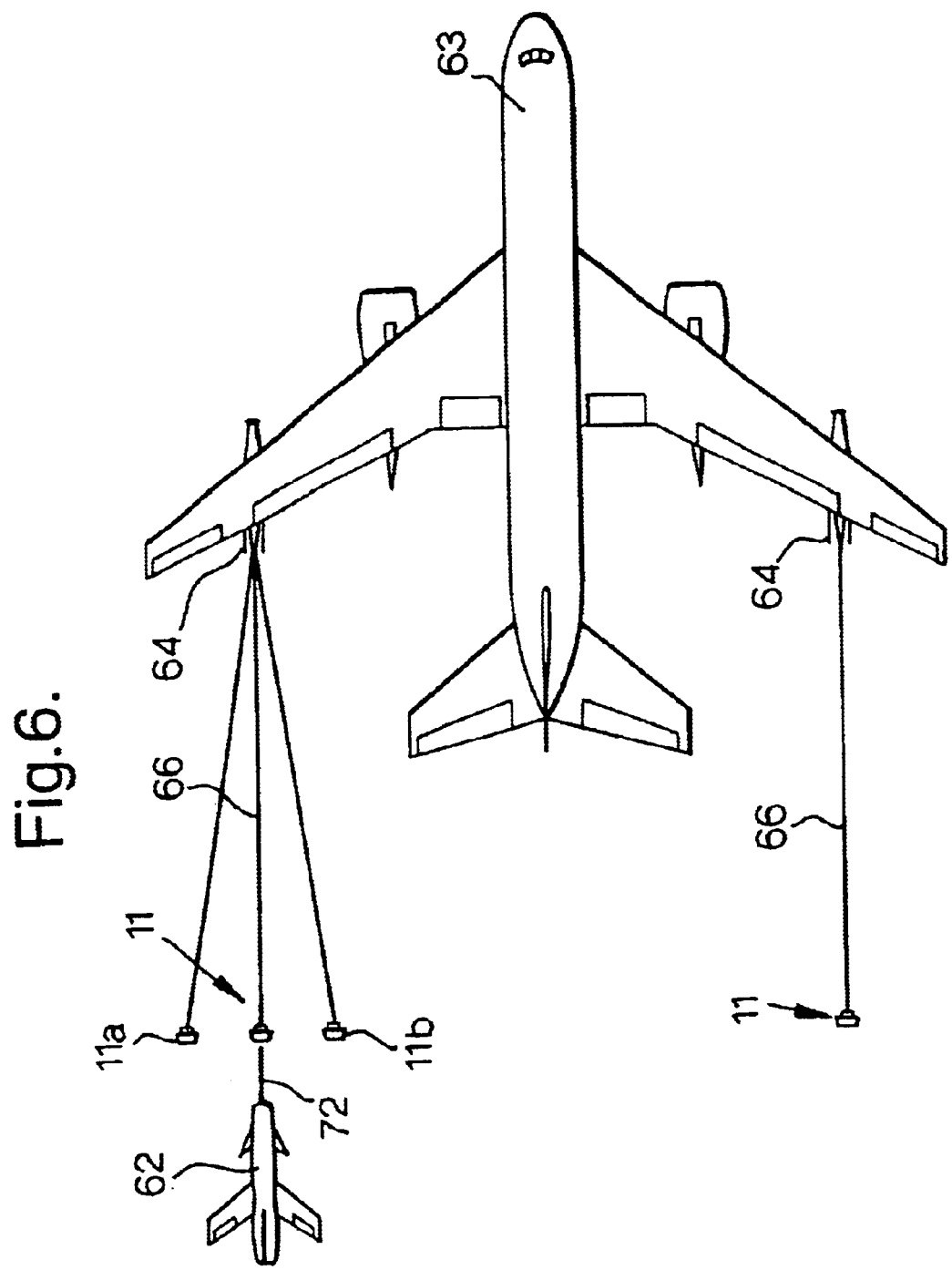

FIG. 5 is a diagrammatic side view of part of a control mechanism for adjusting the canopy and FIG. 6 is a view looking down onto a tanker aircraft with drogues and fuel hoses extended, one drogue being shown in three different positions, and Looking at FIG. 2, a drogue 10 comprises a body 11 having a leading end 12 carrying a fuel hose attachment 14. The fuel hose attachment 14 is connected to a conduit 16 which passes through body 11 and into a refuelling receptacle 18 having a refuelling valve 20.

An electric current generator 22 is arranged at the leading end 12 and is powered by ram air turbine blades 24 via gear box 26.

The body 11 carries three adjustable flying surfaces in the form of two lateral stabilisers 28 and a single vertical stabiliser 30. The stabiliser 28, 30 are controlled by means of an actuator unit 32 which is powered by electricity from the generator 22. The actuator unit 32 is itself controlled by an accelerometer and a global positioning system processing unit 34, the unit 34 being powered by electricity from the generator 22.

Figure 4:
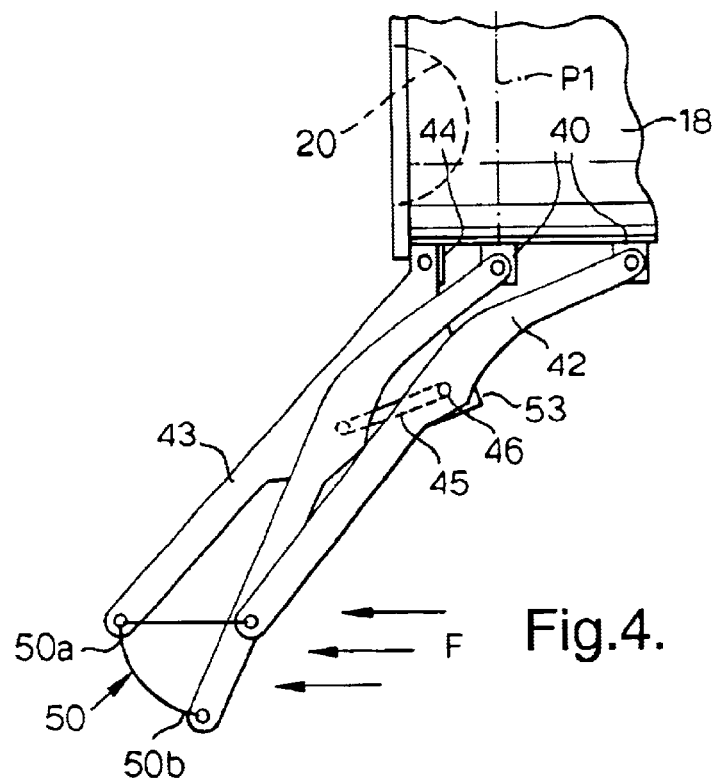
FIG. 4 is a view to a larger scale showing part of a rib arrangement for supporting a canopy of the drogue.

The body 11 contains a drogue actuator control unit 36 which drives a plurality of control rods 38 connected to a fulcrum ring 40. The ring 40 is pivotally connected to the inner ends of a plurality of adjustable ribs 42. In the present embodiment, there are forty two adjustable ribs circumferentially spaced around ring 40. A corresponding number of further ribs 43 is provided each of which is pivotally mounted on a fulcrum ring 44. As shown clearly in FIG. 4, each of the further ribs 43 is formed with angled slot 45 and its associated adjustable rib 42 has a pin 46 thereon which projects into the slot 45. The pins 46 are slidable in the slots 45 and pivotally interconnect the respective ribs 42, 43. As shown in FIG. 2, the ring 40 is adjustable axially as described below along the refuelling receptacle 18 by means of the drogue actuator control unit 36. The ring 40 is moveable for adjustment from a first position P1 in which each pin 46 lies at one end of its associated slot 45 to a second position P2 in which each pin 46 lies at the opposite end of its associated slot 45. The position of the adjustable ribs 42 is shown shaded black in the first position P1 of the ring.

FIG. 5 illustrates a control mechanism 41 in which the ring 40 is connected by the control rods 38 to a collar 47 mounted on a spherical bearing 48 for angular movement thereon somewhat after the fashion of a gimbal. The bearing 48 is mounted for axial sliding movement on a guide 48a. The collar 47 is pivotally connected to ends of four driving rods 49 which are connected at their opposite ends to respective actuators (not shown) in the drogue actuator control unit 36. The driving rods 49 are equally spaced circumferentially around the collar 47 and the acutators are arranged to operate so that diametrically opposite driving rods 49 will move in opposite directions by equal distances as shown by the full and broken line representation in FIG. 5.

A canopy 50 has a trailing edge 50a carried by the outer ends of the further ribs 43 and a leading edge 50b carried by the outer ends of the adjustable ribs 42. It will be noted that when the ring 40 is in its second position P2 the canopy 50 takes on the form of a cylinder generally coaxial with the body 10 so that a parachute effect is not created by airflow F. However, when the ring 40 is moved into its first position P1 by moving the driving rods 49 simultaneously to shift the bearing 48 to the right as viewed in FIG. 5, the leading edge 50b of the canopy 50 is moved outboard of the trailing edge 50a of the canopy 50. In that way, airflow F inflates the canopy 50 and a parachute effect, and hence drag, is created. In the fully inflated position of the canopy 50, the fulcrum ring 44 contacts a peripheral flange 55 on the refuelling receptacle 18.

With the ring 40 in its second position P2, the driving rods 49 may be adjusted by the control unit 36 so that the collar 47 tips angularly on the bearing 48. Such tipping movement is transmitted to the ring 40 via the control rods 38. In that way, a portion 40a of the ring 40 will move towards the flange 55 while a diametrically opposite portion 40b of the ring 40 will move away from the flange 55. By doing that, selected adjustable ribs 42 will move relative to the others and will cause diametrically opposite portions of the cylindrical canopy 50 to tip outwards and inwards respectively so as to create, in use, a slight parachute effect and increase aerodynamic drag particularly over that portion of the canopy tipped outwardly.

The use of the refuelling drogue will now be described with particular reference to FIG. 6.

Figure 1:
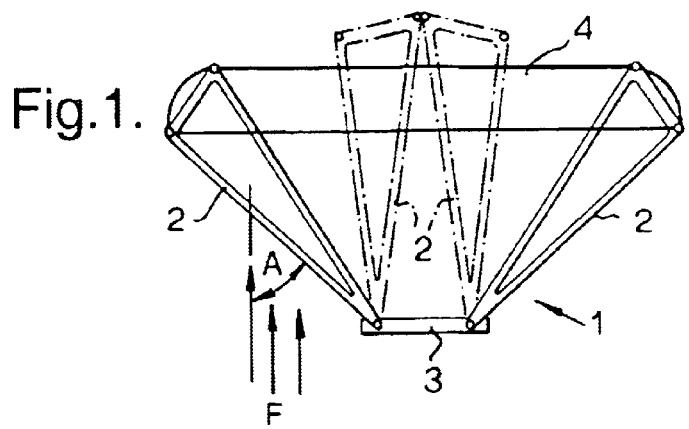

A tanker aircraft 63 on which drogues 11 in accordance with the invention are mounted receives instructions to refuel one or more UAV's 62 and the tanker aircraft 63 flies to the correct co-ordinates in readiness. The tanker aircraft 63 has port and starboard pods 64 which contain the drogues 11 in a stowed form. To move into the stowed form, the bearing 48 is drawn back along the guide 48a so that surfaces 53 on the further ribs 43 contact a stop surface (not shown) on the body 11 as the collar 47 is drawn back which causes the further ribs 43 to take up a folded position somewhat like the ribs 2 in FIG. 1.

At a given signal, each pod 64 opens to deploy the drogue 11 and the ring 40 is moved to its first position P1 where the ribs are shown shaded black in FIG. 2. In that position, air streaming past the pods 64 inflates the canopy 50 of each drogue 11 and the drogues 11 begin to draw fuel hoses 66 from the pods 64. Eventually, the hoses reach their fully extended positions shown in FIGS. 6 and 7. In those position, the drag on each drogue can easily be 1,000 pounds making it difficult to move from the position it naturally adopts due to dihedral effect. However, in accordance with the present invention, the ring 40 is then moved back into its second position P2 so that the canopy 50 takes on the cylindrical configuration shown in FIGS. 2, 4 and 5. In that position, drag on the canopy 50 is minimal.

In order to control the position of the drogue 11, the drogue actuator control unit 36 operates the ring 40 so as to move appropriate ribs 42 whereby diametrically opposite portions of the canopy 50 move in opposite directions slightly out of the cylindrical form. The effect of the airflow F on the canopy is such as to move the drogue 11 away from the central position shown in FIG. 5 to an offset position, for example as indicated at 11a or 11b. Should the drogue 11 encounter pockets or movement of air which would tend to upset its stability, the vertical and/or lateral stabilisers 28,30 will operate in response to an arrangement of accelerometers (not shown) associated with the processing unit 34 so as to restore stability. In that way, the stability of the aircraft can be maintained when approached by a receiver aircraft thereby making the docking of the receiver easier. However, as the stabilisers 28, 30 are required only for restoration of stability and not for moving the entire drogue 11 a substantial distance to a new offset position, for example from the central position shown in FIG. 6 to the offset position 11a, they need have only relatively small surface areas. In that way fast response can be achieved with the use of small actuators.

Once a refuelling probe 72 on the UAV 62 is coaxial with the refuelling receptacle 18, the UAV moves forward to insert the probe 72 through the refuelling valve 20 and refuelling can begin. It will be appreciated that the greatly reduced drag on the drogue 11 is of considerable benefit when refuelling an aircraft such as a small UAV 62 and the present invention is particularly advantageous in that respect.

After the refuelling is complete, the UAV 62 detaches from the refuelling receptacle 18 and the fuel hoses 66 are retracted until the drogues 11 re-enter the pod 64 for stowage.

It is envisaged that a swivel (not shown) will be incorporated in the fuel hose attachment 14 to permit substantially free rotational movement of the drogue 11 relative to its associated hose 66.

What is claimed is:

1. A drogue for in-flight refuelling comprising a canopy supported by a plurality of adjustable supports, control means for moving the supports into a first position, in which the air stream can inflate the canopy whereby drag on the canopy, in use, will cause the drogue to draw a fuel hose from a tanker aircraft into an extended position, and into a second position in which drag on the canopy in the extended position will be reduced, at least one of the adjustable supports being movable relative to the others by said control means to adjust a selected portion of the canopy whereby the drag on that portion will be increased and the drogue will move laterally to a new position.

2. A drogue according to claim 1 in which the adjustable supports move the canopy so that the canopy takes on a substantially cylindrical form to minimise drag.

3. A drogue according to claim 1 in which further supports are provided for the canopy.

4. A drogue according to claim 3 in which the canopy is arranged such that one edge is mounted on the adjustable supports and another edge is mounted on the further supports.

5. A drogue according to claim 2 in which the further supports are pivotally connected to the adjustable supports.

6. A drogue according to claim 2 in which some of the supports are formed with slots in which the others of said supports are slidable.

7. A drogue according to claim 6 in which the further supports are formed with the slots.

8. A drogue according to claim 1 in which the adjustable supports are connected to mounting means which can be moved angularly to control the positions of given adjustable supports relative to others.

9. A drogue according to claim 8 in which the mounting means can be moved axially of the drogue so as to move all adjustable supports simultaneously.

10. A drogue according to claim 8 in which the mounting means is movable by a control mechanism which includes an angularly movable driving element.

11. A drogue according to claim 10 in which the driving element is mounted for angular movement on a bearing.

12. A drogue according to claim 11 in which the bearing is mounted for axial movement on part of the drogue.

13. A drogue according to claim 10 in which the driving element is in the form of a collar.

14. A drogue according to claim 10 in which the angularly moveable driving element is arranged such that when the element is tipped in one direction to move selected adjustable mounting means in said one direction, another portion of the element tips in an opposite direction to move further selected adjustable mounting means in said opposite direction.

15. A drogue according to claim 1 in which a controllable flying surface arrangement is proved for controlling stability of the drogue.

16. A drogue according to claim 15 in which the flying surface arrangement operates in response to a signal received from sensor means on the drogue.

17. A drogue according to claim 15 in which electric power for operating the flying surface arrangement is generated by air-driven turbine on the drogue.

18. A fuel tanker aircraft having a drogue according to claim 1 for in-flight refuelling.

19. A method of controlling a drogue for in-flight refuelling comprising a canopy supported by a plurality of adjustable supports, the method comprising positioning the supports to allow an air stream to inflate the canopy such that drag on the canopy causes the drogue to draw a fuel hose from a tanker aircraft into an extended position, adjusting the adjustable supports so as to position the canopy to reduce drag on the canopy in the extended position and controlling one or more of the adjustable supports to cause drag to vary on a selected portion of the canopy and thereby cause the drogue to move laterally to a new position.

* * * * *